Jan. 25, 1955   A. W. BRANT ET AL   2,700,321
METHOD AND APPARATUS FOR DETECTING BLOOD IN EGGS
Filed July 31, 1953   2 Sheets-Sheet 2

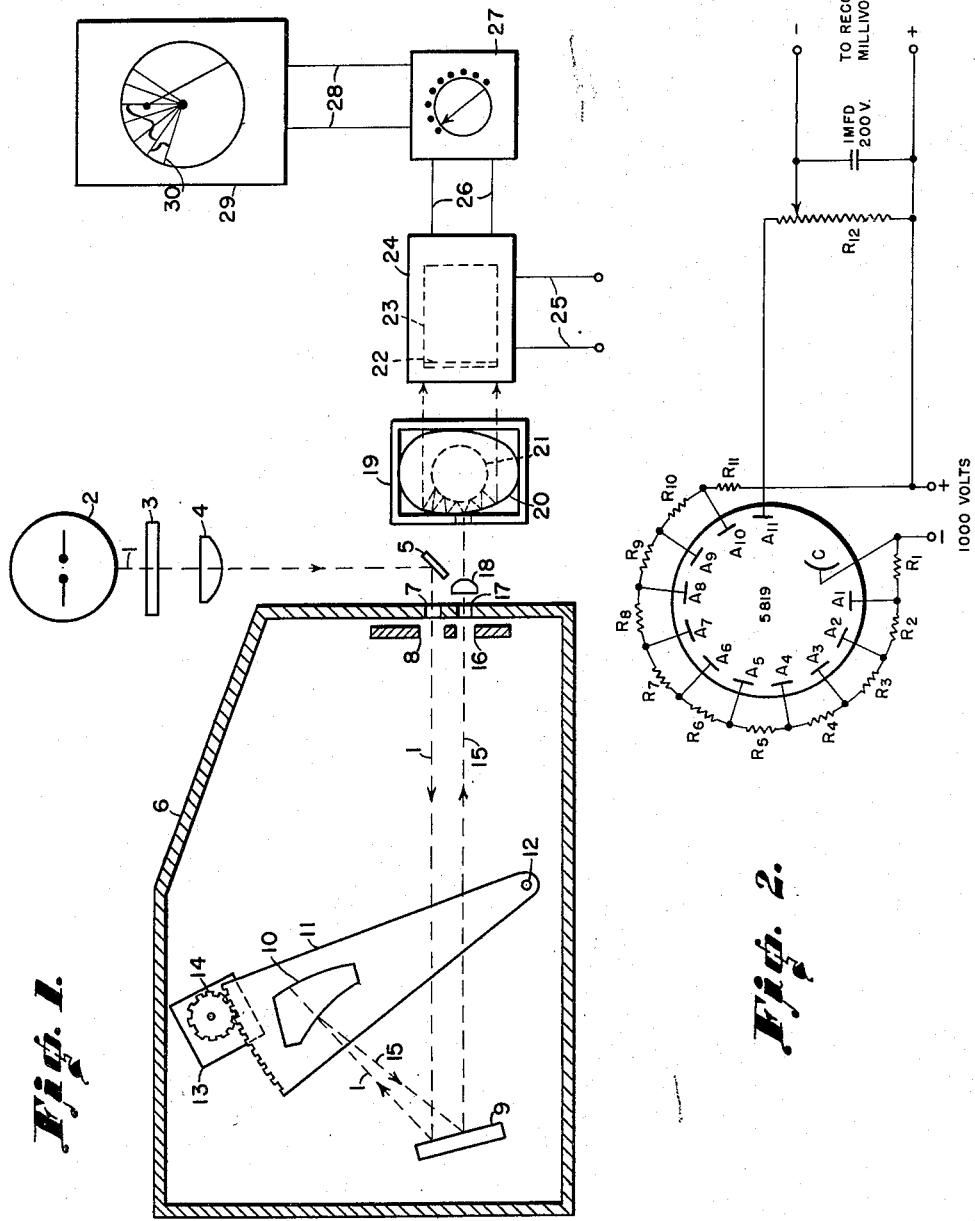

INVENTORS
A.W. BRANT
K.H. NORRIS

BY
R. Hoffman
ATTORNEY ated Jan. 25, 1955

2,700,321

METHOD AND APPARATUS FOR DETECTING BLOOD IN EGGS

Albert W. Brant, Hyattsville, and Karl H. Norris, Beltsville, Md., assignors to the United States of America as represented by the Secretary of Agriculture Application July 31, 1953, Serial No. 371,748

3 Claims. (Cl. 88—14.1)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to an apparatus capable of detecting blood spots in intact shell eggs.

It has previously been proposed to detect the presence of blood in eggs by passing a beam of light having an abundance of wave lengths in the range of 12,600 to 14,000 angstrom units through the egg and measuring the amount of light transmitted. This was done by focusing the transmitted beam on a magnesium oxide-caesium photo tube connected to a conventional amplifier circuit. Eggs containing blood were stated to show a selective absorption in the previously-mentioned wave length band.

In our investigations relating to the light absorption by avian blood, it was found that, when light transmittance in the region of 585 to 565 m$\mu$ was recorded, eggs containing even very small blood spots could be segregated because they had reduced transmittance at 575 m$\mu$ in comparison to eggs containing no blood.

An object of this invention is to provide an apparatus whereby it is possible to detect the presence of blood spots as small as about 1/8 inch in diameter with a high degree of accuracy.

Another object is to provide an apparatus capable of rapidly determining the presence of small amounts of blood in eggs and producing a permanent record of such finding.

Other objects will become apparent from the following description and the accompanying drawings.

In the drawings:

Figure 1 represents a schematic showing of the modified spectrophotometer used as a monochromator which constitutes our invention.

Figure 2 is a diagram of the electrical circuit used in measuring and recording the light transmittance.

Figure 3:
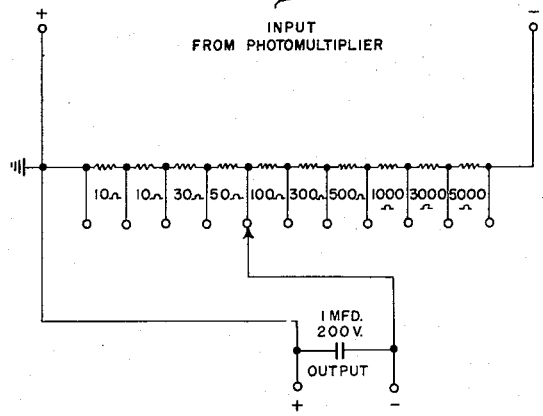
Figure 3 is a detail of the sensitivity adjustment circuit represented by $R_{12}$ in Figure 2.

A light beam 1 from a 300-watt zirconium-arc lamp 2 is directed through filter 3 and lens 4 at mirror 5. The beam is reflected inside monochromator housing 6 through hole 7 and slit 8, where it strikes mirror 9 which directs it at prism 10. This prism is secured to gear segment 11 which is pivotally mounted in the monochromator housing by means of pivot 12. The prism is driven in a reciprocating motion through an appropriate arc by means of wavelength drive motor 13 and pinion 14. The refracted beam of light 15 constituting the successive individual wavelengths of the band 585 m$\mu$ to 565 m$\mu$, is directed back to mirror 9 whence it is reflected out of the monochromator through slit 16 and opening 17 in the monochromator housing. It then passes through lens 18 into egg holder 19 and finally into egg 20 itself. The transmitted light, with the appropriate wavelengths absorbed by blood spot 21, is permitted to fall on the cathode 22 of photomultiplier tube 23 mounted inside housing 24. Power for the photomultiplier tube is supplied through leads 25. The output from the photomultiplier is passed by means of connections 26 through a sensitivity adjuster 27 and then, by means of connections 28 to recording millivoltmeter 29. Traces of the transmittance for each egg examined are obtained on chart 30.

In constructing the apparatus of our invention, it was necessary to alter existing equipment. Thus, to obtain light having an abundance of the required wavelengths, the usual tungsten light source was replaced by a 300 watt zirconium-arc lamp 2. Also, it was desirable for the curves for normal eggs to have transmittance curves between 585 and 565 m$\mu$ that would move upward from the starting point at 585 m$\mu$. This was accomplished to a large extent by inserting the filter 3 in the light source. The filter was obtained by filling a flask with a mixture of aqueous solutions of light green SF and metanil yellow, and adjusting the concentrations of these dyes empirically until the desired curves for normal eggs were obtained on recorder 29. With this filter in place, eggs containing blood produced curves showing a lower transmittance at 575 m$\mu$ than at either 585 m$\mu$ or 565 m$\mu$. Eggs containing no blood had a transmittance at 575 m$\mu$ that was either equal to or higher than the transmittance at 565 m$\mu$ and usually, but not always, higher than at 585 m$\mu$.

Another change in the conventional apparatus consisted in replacing the phototube and its amplifier circuit by a photomultiplier tube connected to the recording millivoltmeter through a sensitivity adjustment circuit. In the specific apparatus constructed by us, we used an RCA 5819 photomultiplier. Figure 2 is a diagram of the circuit used. An E. M. F. of 1000 volts D. C. is supplied to the photomultiplier tube, with the cathode negative (—). The individual anodes $A_1$ to $A_{10}$ are connected to each other and to the power supply as shown by means of resistors $R_1$ to $R_{11}$. In the apparatus used, $R_1$ to $R_{10}$ each had a value of 470,000 ohms, with $R_{11}$ being 390,000 ohms. The output anode $A_{11}$ was connected to the sensitivity adjustment circuit which consisted of a plurality of resistors in series having a total resistance $R_{12}$ of 10,000 ohms, with taps provided for varying the sensitivity adjustment. The details of this circuit are shown in Figure 3.

The extreme sensitivity and accuracy of our apparatus can be seen from the results of tests on 600 eggs summarized in the table below.

Table.—*Accuracy of detecting blood in white-shell eggs by spectrophotometric means*

| Class | Description* | Number of Eggs | Spectrophotometric Indication | | |
|---|---|---|---|---|---|
| | | | Correct | | Incorrect |
| | | | No. | Percent | No. |
| Clear eggs | Eggs containing no blood or containing no spots larger than 1/32 inch in diameter. | 379 | 378 | 99.7 | 1 |
| Bloody eggs | Eggs containing blood spots larger than 1/8 inch in diameter. Includes bloody whites. | 207 | 203 | 98.1 | 4 |
| Slightly bloody eggs. | Eggs containing blood spots between 1/32 and 1/8 inch in diameter. | 14 | 4 | 28.6 | 10 |
| All bloody eggs. | "Bloody" and "slightly bloody" classes combined. | 221 | 207 | 93.7 | 14 |
| All eggs | | 600 | 585 | 97.5 | 15 |

*All eggs were broken-out and classified by examination of the contents.

Figure 4:
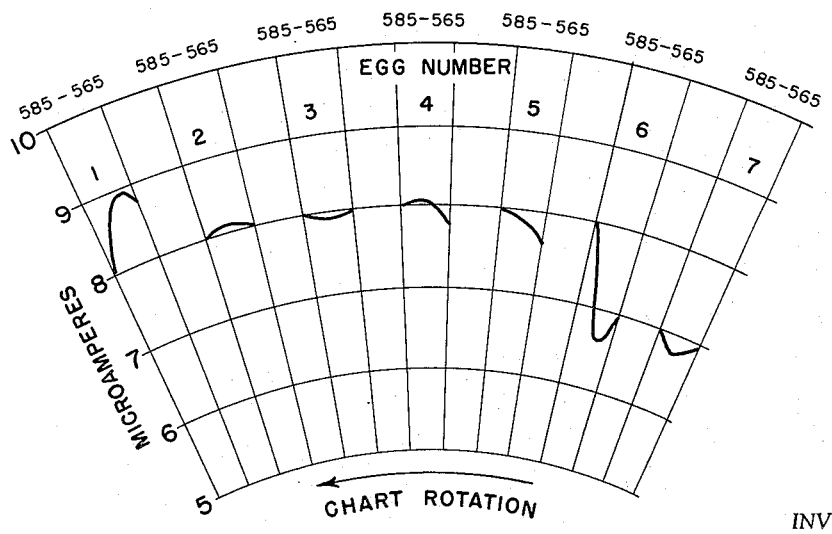
Figure 4 is a facsimile of a portion of an actual chart produced by the recording millivoltmeter.

Figure 4 is a facsimile of a portion of a chart produced by the recording millivoltmeter. As can be seen, the maxima or minima at 575 m$\mu$ indicates the absence or presence, respectively, of blood spots in a series of eggs tested. Thus, the apparatus accurately indicated the absence of blood in eggs 1, 2, 4, and 5 by recording a maximum transmittance at 575 m$\mu$, and showed the presence of blood in eggs 3, 6, and 7 by recording minimum transmittance at 575 m$\mu$.

We claim:

1. Apparatus for detecting the presence of small amounts of blood in intact eggs comprising: a source of light generating an abundance of wavelengths in the band 565 m$\mu$ to 585 m$\mu$; a monochromator for receiving said generated light and breaking it down into and transmitting individual wavelengths of said band; a filter interposed between the source of light and the monochromator for restricting the generated light to substantially the band 565 m$\mu$ to 585 m$\mu$; photoelectric means disposed in the path of light transmitted by the monochromator adapted to convert variations in light intensity to corresponding variations in electric current; an egg holder interposed between the monochromator and the photoelectric means in such position that, when containing an egg to be tested, said transmitted light will pass through said egg before impinging on the photoelectric means; and means connected to said photoelectric means for recording the variations in electric current generated by the variations in light impinging on said photoelectric means.

2. A method for detecting the presence of small amounts of blood in intact eggs comprising: providing a source of light generating an abundance of wavelengths in the band 565 m$\mu$ to 585 m$\mu$; separating said band into its spectral components; passing said components individually and consecutively through an intact egg; illuminating photosensitive means by said individual spectral components transmitted by the egg; and amplifying and recording the signal generated by the action of the transmitted light on said photosensitive means.

3. A method for detecting the presence of small amounts of blood in intact eggs comprising: providing a source of light generating an abundance of wavelengths in the band 565 m$\mu$ to 585 m$\mu$; separating said band into its spectral components; passing said components individually and consecutively through an intact egg known to be free of blood; illuminating photosensitive means by said individual spectral components transmitted by the egg; amplifying and recording the signal generated by the action of the transmitted light on said photosensitive means to obtain a characteristic transmittance pattern for blood-free eggs over the band 565 m$\mu$ to 585 m$\mu$; substituting an unknown egg to be tested for the blood-free standard; and amplifying and recording the signal generated by the light transmitted by the unknown egg to obtain the characteristic transmittance pattern for said unknown egg over the band 565 m$\mu$ to 585 m$\mu$, whereby the presence of blood in the unknown egg is indicated by a lower transmittance at 575 m$\mu$ on the characteristic pattern of the unknown egg record with respect to the transmittance at 575 m$\mu$ on the pattern of the blood-free egg.

References Cited in the file of this patent

UNITED STATES PATENTS

| | | |
|---|---|---|
| 2,118,794 | King | May 24, 1938 |
| 2,321,899 | Dooley | June 15, 1943 |
| 2,481,567 | Brown | Sept. 13, 1949 |
| 2,526,509 | Shawhan | Oct. 17, 1950 |
| 2,670,648 | Miller et al. | Mar. 2, 1954 |